(12) United States Patent
Klinedinst et al.

(10) Patent No.: US 7,176,626 B2
(45) Date of Patent: *Feb. 13, 2007

(54) METHOD OF CONTROLLING LEACHABLE MERCURY IN LAMPS

(75) Inventors: Keith A. Klinedinst, Hudson, MA (US); Dennis B. Shinn, Topsfield, MA (US)

(73) Assignee: Osram Sylvania Inc., Danvers, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 10/883,081

(22) Filed: Jul. 1, 2004

(65) Prior Publication Data

US 2006/0001367 A1 Jan. 5, 2006

(51) Int. Cl.
*H01J 5/48* (2006.01)
*H01J 5/50* (2006.01)
*H01J 17/20* (2006.01)

(52) U.S. Cl. ............... 313/565; 313/571; 313/318.02; 313/638

(58) Field of Classification Search ............... 313/565, 313/571, 318.02, 638
See application file for complete search history.

(56) References Cited

U.S. PATENT DOCUMENTS

| 5,229,686 | A | 7/1993 | Fowler et al. ............... 313/565 |
| 5,229,687 | A | 7/1993 | Fowler et al. ............... 313/565 |
| 5,736,813 | A | 4/1998 | Foust et al. .................. 313/490 |
| 5,994,838 | A * | 11/1999 | Klinedinst et al. .......... 313/565 |
| 6,515,421 | B2 | 2/2003 | Dietrich et al. ............. 313/626 |
| 2002/0190646 | A1 | 12/2002 | Haitko et al. | |

* cited by examiner

*Primary Examiner*—Nimeshkumar D. Patel
*Assistant Examiner*—Peter Macchiarolo
(74) *Attorney, Agent, or Firm*—Carlo S. Bessone

(57) ABSTRACT

A method for inhibiting mercury from leaching from a land-filled arc discharge lamp containing a quantity of elemental mercury at least partially convertible to soluble mercury, provides for including within the lamp a quantity of a non-metallic copper-containing compound and an ingredient X, said ingredient X including a noble metal or a noble metal compound selected from the group consisting of silver and compounds of silver, gold and platinum, and a lamp containing same. The inhibiting compound is preferably included with the basing cement.

9 Claims, 2 Drawing Sheets

METHOD OF CONTROLLING LEACHABLE MERCURY IN LAMPS

TECHNICAL FIELD

This invention relates to mercury vapor discharge lamps and more particularly to fluorescent lamps. Still more particularly it relates to lamps that can be landfilled without leaching potentially damaging mercury into the environment.

BACKGROUND ART

During the manufacture of a fluorescent lamp, as well as other types of arc discharge lamps, a quantity of elemental mercury is sealed within the lamp envelope. It is known that in operation some of the elemental mercury contained in these lamps can be converted to a mercuric oxide or a mercury salt. This is true in fluorescent lamps in particular. In such lamps most of this mercury adheres to the phosphor coating deposited upon the inside wall of the lamp envelope, leaving only a small portion of the mercury in the form of mercury vapor. After the alkaline earth metal oxides coating the lamp electrodes are volatilized, the oxides decompose in the discharge space, and the freed oxygen converts some of this elemental mercury to a salt or compound such as the above-mentioned mercuric oxide (HgO) which is water soluble.

There is a growing concern that a waste stream resulting from the disposal of arc discharge lamps such as fluorescent lamps may leach excessive amounts of soluble mercury into the environment. One method of measuring the amount of soluble mercury, which may leach from the waste stream resulting from the disposal of fluorescent lamps, is described in the Toxicity Characteristic Leaching Procedure (TCLP) prescribed on pages 26987–26998 of volume 55, number 126 of the Jun. 29, 1990 issue of the Federal Register. According to the procedure, the lamp being tested is pulverized into granules having a surface area per gram of material equal to or greater than 3.1 $cm^2$ or having a particle size smaller than 1 cm in its narrowest dimension. Following pulverization, the granules are subjected to a sodium acetate buffer solution having a pH of approximately 4.93 and having a weight twenty times the weight of the granules.

At the present time, the Environmental Protection Agency defines a maximum concentration level for mercury at 0.2 milligram leachable mercury per liter extract fluid when the TCLP is applied. According to present standards, a fluorescent lamp is considered nonleachable, and thus available for conventional landfill deposition, when less than 0.2 milligram per liter of leachable mercury results from a TCLP extraction.

Various methods have been proposed which attempt to treat or process burned-out discharge lamps or scrap lamp exhaust tubing containing mercury in order to reclaim the mercury and thereby reduce the amount of mercury-contaminated scrap. These methods are summarized as background in U.S. Pat. Nos. 5,229,686 and 5,229,687, which describe methods by which to render a mercury vapor lamp nonleaching upon disposal without the use of expensive treatment processes to reclaim the mercury. The method of U.S. Pat. No. 5,229,686 employs a chemical agent, enclosed within the lamp, suitable for chemically combining a substantial portion of the soluble mercury as a sparingly soluble salt when the lamp is pulverized as a result of disposal. The method of U.S. Pat. No. 5,229,687 employs a chemical agent, enclosed within the lamp, suitable for electrochemically reducing a substantial portion of the soluble mercury to elemental mercury, again when the lamp is pulverized during disposal. Preferably, this chemical agent is an element which has an electrode potential for oxidation reactions higher than mercury but which is not sufficiently active to displace hydrogen from acidic aqueous solutions. In a preferred embodiment, the chemical agent is sealed within an enclosure (e.g., glass), which is rupturable upon pulverization of the lamp. In another embodiment, the chemical agent is mixed with the basing cement used to secure the lamp bases to the glass envelope. The chemical agent acts to reduce soluble mercury produced during lamp operation to elemental mercury, which is not leachable as measured by the TCLP.

The chemical agent used in '687 may be used in various forms, e.g., as a powder, dust, wire mesh, or metallic foil. The amount or size of the chemical agent is directly related to the surface area and surface condition, finely divided metallic powders being preferred over a solid mass because of their relatively large effective surface areas. Because of their availability and inexpensive cost, iron and copper, in the form of a powder or dust, are preferred. The amount of chemical agent present should be sufficient to electrochemically reduce the amount of soluble mercury within the lamp which is leached at the time of disposal to less than 0.2 milligram per liter of an aqueous acid solution such as a sodium acetate buffer solution as prescribed in the TCLP.

However, there are several disadvantages to the methods described in U.S. Pat. No. 5,229,686 and '687. In regard to '686, the quantity of chemical agent required to chemically combine nearly all of the mercury within a fluorescent lamp may be so large as to be inconvenient or impossible to contain within a standard lamp envelope. In regard to '687, the metallic copper or iron reduces the amount of leachable mercury via a surface redox reaction between adsorbed mercury ions and zero-valent metal atoms. In order for this reaction to occur, the dissolved ionic mercury must first find its way to and become adsorbed upon the metal surface. Thus, the effectiveness of a metallic element as a means of reducing leachable mercury will ultimately be limited by the rates at which mercury ions diffuse to the metal surface and become adsorbed thereon. A means of reducing leachable mercury that did not depend upon the chance contact between dissolved mercury ions and a metal surface followed by the adsorption of the mercury upon that surface would be likely to be more efficient and, therefore, preferable.

It may also be difficult or impossible to incorporate a sufficiently large quantity of a finely divided metal within a fluorescent lamp, the more so the smaller or more compact the lamp. In a small lamp, the only convenient way to introduce the metal may be as a component of the basing cement. However, the electrical conductivity of the metal may prevent its incorporation into the basing cement since the cement may easily come into contact with internal electrical leads. On the other hand, electrically insulating materials might easily be added to the basing cement in addition to or in place of the normal $CaCO_3$ cement filler without risk of creating electrical short circuits within the lamp.

In U.S. Pat. No. 5,736,813, it is disclosed that "the formation of leachable mercury upon disposal or during TCLP testing of mercury vapor discharge lamps is substantially prevented by incorporation of a pH control agent in the lamp structure or in the test solution to provide a pH of about 5.5 to 6.5." A low pressure mercury discharge lamp is claimed which includes about 5–15 grams of a pH control agent (generally a water-soluble base) which, it is suggested, is sufficient to substantially prevent formation of ferric and cupric compounds which oxidize elemental mercury to a soluble form. The primary disadvantage of this method of reducing mercury leaching is that it may be difficult or, depending upon the lamp type, practically impossible to package the relatively large amounts of the required pH control agent (5–15 grams) within the structure of a typical mercury vapor lamp.

Recently, an improved mercury vapor discharge lamp was described in which an effective amount of a nonmetallic copper-containing compound which, when the lamp is pulverized to granules and subjected to a suitable aqueous acid solution, dissolves in the acid solution, resulting in a concentration of extracted mercury less than 0.2 mg per liter of solution. The effective amount of soluble copper is relatively small (between 0.1 and 4 mg per gram of total lamp weight, depending upon lamp type and size, total mercury loading, etc.). However, copper in the environment, although relatively harmless, may be toxic to certain marine invertebrates. In order to eliminate the possibility of damage to ecological systems, the EPA has placed a limit of 25 mg/L for copper levels in discharges from nonferrous operations to lakes and streams. It is desirable, therefore, to minimize the amount of soluble copper, which is effective with respect to the control of mercury leaching. Further, the smaller the quantity of nonmetallic copper-containing compound, the more easily it will be to incorporate within the lamp.

The use of so-called noble metals and metal salts has also been suggested for the control of mercury leaching in fluorescent lamps. U.S. Pat. No. 6,515,421 describes a method and apparatus for preventing the formation of leachable mercury in mercury arc vapor discharge lamps, which comprises coating at least one of the metallic components of the lamp with at least one noble metal coating (typically silver or palladium). A method and apparatus for preventing the formation of leachable mercury in mercury arc vapor discharge lamps which comprises providing in the lamp structure an effective amount of a silver salt, gold salt, or combination thereof, is described in U.S. Published Patent Application No. 2002/0190646 A1. While these methods may be effective for the control of leachable mercury, they are generally not practical due to the relatively high costs of the noble metals and metal salts. However, the use of such noble metals or metal salts might become practical if a relatively inexpensive means were found to substantially reduce the amounts of these substances which are required to effectively reduce or control mercury leaching.

DISCLOSURE OF INVENTION

It is, therefore, an object of the invention to obviate the disadvantages of the prior art.

It is another object of the invention to enhance the disposability of mercury-containing discharge lamps.

Yet another object of the invention is the provision of a method for controlling leachable mercury in discharge lamps.

These object are accomplished, in one aspect of the invention, by a method for inhibiting mercury from leaching from a land-filled arc discharge lamp that contains a quantity of elemental mercury at least partially convertible to soluble mercury, the method comprising including within the lamp a quantity of a non-metallic copper-containing compound and an ingredient X, said ingredient X including a noble metal or noble metal compound selected from the group consisting of silver and compounds of silver, platinum and gold.

The combination of the non-metallic copper-containing compound and the noble metal or noble metal compound provides a method that is effective, inexpensive and easy to apply.

BEST MODE FOR CARRYING OUT THE INVENTION

Figure 1:
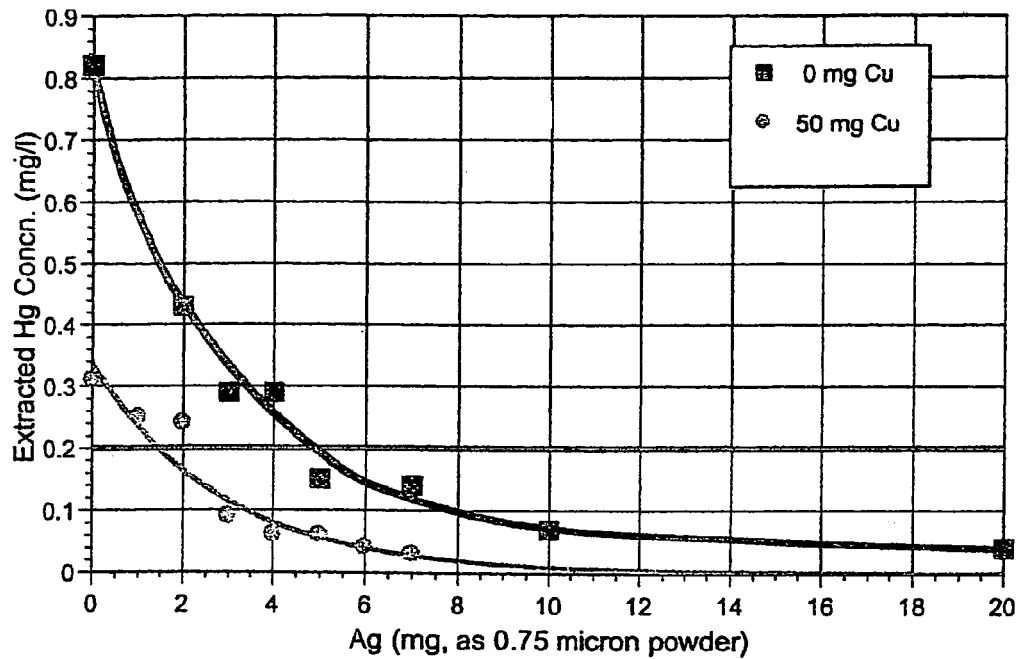
FIG. 1 is a graph providing test results with various amounts of silver addition.

For a better understanding of the present invention, together with other and further objects, advantages and capabilities thereof, reference is made to the following disclosure and appended claims taken in conjunction with the above-described drawings.

Referring now to the invention with greater particularity, it has been discovered that a relatively small amount of a soluble non-metallic copper-containing compound used in combination with a small quantity of metallic silver or a compound of silver, platinum, or gold in the Toxicity Characteristic Leaching Procedure applied to a mercury vapor discharge lamp containing a quantity of mercury that is at least partially convertible to soluble mercury may be much more effective in preventing mercury leaching than either the copper-containing compound or the metallic silver or compound of silver, platinum, or gold used alone. Thus, as a result of the presence of a small amount of metallic silver or a compound of silver, platinum, or gold, concentrations of extracted mercury much less than 0.2 mg per liter of solution may be obtained with quantities of soluble copper-containing compounds substantially smaller than would be required to achieve the same extracted mercury concentrations in the absence of the metallic silver or compound of silver, platinum, or gold. Conversely, as a result of the presence of a relatively small amount of a soluble copper-containing compound, concentrations of extracted mercury much less than 0.2 mg per liter of solution may be obtained with quantities of metallic silver or of compounds of silver, platinum, or gold substantially smaller than would be required to achieve the same extracted mercury concentrations in the absence of the dissolved copper compound. Various aspects of this invention are presented in the following examples.

EXAMPLE 1

A series of four TCLP tests were carried out with commercial 32WT8 fluorescent lamps manufactured without metallic mercury but with 6 mg of ionic mercury (as HgO) soluble in the TCLP extraction fluid. No additives were used in one of the tests. However, each of the other three tests included 50 mg of copper as the compound copper dihydroxide carbonate (CDC), 4 mg ($4 \times 10^{-5}$ mole) of finely divided metallic silver (with most particles in the 0.5–1.0 micron range), or a combination of the two. The TCLP test results (leached mercury concentration in units of mg per liter of extraction fluid) are listed in Table I below for T8 lamps with 6 mg soluble $Hg^{2+}$.

TCLP Results for T8 Lamps without Metallic Hg, with 6 mg Soluble $Hg^{2+}$, and with a Soluble Copper-Containing Compound (CDC), Finely Divided (0.5–1.0 Micron) Metallic Silver, a Combination of CDC and Finely Divided Metallic Silver, or No Additive Added at the Start of the Test

TABLE I

| Cu (as CDC) (mg) | Ag (0.5–1.0 micron) (mg) | Leached Hg (mg/L) |
|---|---|---|
| 0 | 0 | 0.82 |
| 50 | 0 | 0.31 |
| 0 | 4 | 0.29 |
| 50 | 4 | 0.05 |

It is seen that a relatively small amount of a soluble nonmetallic copper-containing compound used in combination with a small quantity of metallic silver in the Toxicity Characteristic Leaching Procedure applied to a mercury vapor discharge lamp containing a quantity of mercury that is soluble in the acidic extraction fluid may be much more effective in preventing mercury leaching than either the copper-containing compound or the metallic silver used alone.

EXAMPLE 2

Additional TCLP tests were carried out in the same way as those described in Ex. 1 except that 4 mg of silver as silver oxide, $Ag_2O$, was used rather than metallic silver. As before, tests were performed both with and without the presence of 50 mg of copper as CDC. The results of these tests, along with those performed without the addition of silver oxide, are compared in Table 2 below.

TCLP Results for T8 Lamps without metallic mercury, with 6 mg Soluble $Hg^{2+}$ and with a Soluble Copper-Containing Compound (CDC), Silver Oxide ($Ag_2O$), a Combination of CDC and Silver Oxide, or No Additive Added at the Start of the Test.

TABLE II

| Cu (as CDC) (mg) | Ag (as $Ag_2O$) (mg) | Leached Hg (mg/L) |
|---|---|---|
| 0 | 0 | 0.82 |
| 50 | 0 | 0.31 |
| 0 | 4 | 0.24 |
| 50 | 4 | 0.07 |

It is seen that a relatively small amount of a soluble nonmetallic copper-containing compound used in combination with a small quantity of silver oxide in the Toxicity Characteristic Leaching Procedure applied to a mercury vapor discharge lamp may be much more effective in preventing mercury leaching than either the copper-containing compound or the silver compound used alone.

EXAMPLE 3

Additional TCLP tests were carried out in the same way as those described in Ex. 2 except that 4 mg of silver as silver carbonate, $Ag_2CO_3$, was used rather than silver oxide. As before, tests were performed both with and without the presence of 50 mg of copper as CDC. The results of these tests, along with those performed without the addition of silver carbonate, are compared in Table 3 below.

TCLP Results for T8 Lamps without Metallic Hg, with 6 mg Soluble $Hg^{2+}$ and with a Soluble Copper-Containing Compound (CDC), Silver Carbonate ($Ag_2CO_3$), a Combination of CDC and Silver Carbonate, or No Additive Added at the Start of the Test.

TABLE III

| Cu (as CDC) (mg) | Ag (as $Ag_2CO_3$) (mg) | Leached Hg (mg/L) |
|---|---|---|
| 0 | 0 | 0.82 |
| 50 | 0 | 0.31 |
| 0 | 4 | 0.24 |
| 50 | 4 | 0.12 |

As in the preceding example, it is seen that a relatively small amount of a soluble nonmetallic copper-containing compound used in combination with a small quantity of a silver compound in the Toxicity Characteristic Leaching Procedure applied to a mercury vapor discharge lamp may be much more effective in preventing mercury leaching than either the copper-containing compound or the silver compound used alone.

EXAMPLE 4

Additional TCLP tests were carried out in the same way as those described in the preceding examples except that 4 mg of silver as silver chloride, AgCl, was used rather than metallic silver or another silver compound. As before, tests were performed both with and without the presence of 50 mg of copper as CDC. The results of these tests, along with those performed without the addition of silver chloride, are compared in Table 4 below.

TCLP Results for T8 Lamps without Metallic Hg, with 6 mg Soluble $Hg^{2+}$ and with a Soluble Copper-Containing Compound (CDC), Silver Chloride (AgCl), a Combination of CDC and Silver Chloride, or No Additive Added at the Start of the Test

TABLE IV

| Cu (as CDC) (mg) | Ag (as AgCl) (mg) | Leached Hg (mg/L) |
|---|---|---|
| 0 | 0 | 0.82 |
| 50 | 0 | 0.31 |
| 0 | 4 | 0.21 |
| 50 | 4 | 0.05 |

As in the preceding examples, it is seen that a relatively small amount of a soluble nonmetallic copper-containing compound used in combination with a small quantity of a silver compound in the Toxicity Characteristic Leaching Procedure applied to a mercury vapor discharge lamp may be much more effective in preventing mercury leaching than either the copper-containing compound or the silver compound used alone.

EXAMPLE 5

Additional TCLP tests were carried out in the same way as those described in the preceding example except that 7 mg ($4 \times 10^{-5}$ mole) of gold as gold chloride, $AuCl_3$, was used rather than silver chloride. As before, tests were performed both with and without the presence of 50 mg of copper as CDC. The results of these tests, along with those performed without the addition of gold chloride, are compared in Table 5 below.

TCLP Results for T8 Lamps without Metallic Hg, with 6 mg Soluble $Hg^{2+}$, and with a Soluble Copper-Containing Compound (CDC), Gold Chloride ($AuCl_3$), a Combination of CDC and Gold Chloride, or No Additive Added at the Start of the Test.

TABLE V

| Cu (as CDC) (mg) | Au (as $AuCl_3$) (mg) | Leached Hg (mg/L) |
|---|---|---|
| 0 | 0 | 0.82 |
| 50 | 0 | 0.31 |
| 0 | 7 | 0.51 |
| 50 | 7 | 0.10 |

As in the preceding examples, it is seen that a relatively small amount of a soluble nonmetallic copper-containing compound used in combination with a small quantity of a gold compound in the Toxicity Characteristic Leaching Procedure applied to a mercury vapor discharge lamp may be much more effective in preventing mercury leaching than either the copper-containing compound or the gold compound used alone.

EXAMPLE 6

Additional TCLP tests were carried out in the same way as those described in the preceding example except that 8 mg ($4 \times 10^{-5}$ mole) of platinum as platinum chloride, $PtCl_2$, was used rather than silver chloride. As before, tests were performed both with and without the presence of 50 mg of copper as CDC. The results of these tests, along with those performed without the addition of gold chloride, are compared in Table 6 below.

TCLP Results for T8 Lamps without Metallic Hg, with 6 mg Soluble $Hg^{2+}$ and with a Soluble Copper-Containing Compound (CDC), Platinum Chloride ($PtCl_2$), a Combination of CDC and Platinum Chloride, or No Additive Added at the Start of the Test.

TABLE VI

| Cu (as CDC) (mg) | Pt (as $PtCl_2$) (mg) | Leached Hg (mg/L) |
|---|---|---|
| 0 | 0 | 0.82 |
| 50 | 0 | 0.31 |
| 0 | 8 | 0.52 |
| 50 | 8 | 0.03 |

As in the preceding examples, it is seen that a relatively small amount of a soluble nonmetallic copper-containing compound used in combination with a small quantity of a platinum compound in the Toxicity Characteristic Leaching Procedure applied to a mercury vapor discharge lamp may be much more effective in preventing mercury leaching than either the copper-containing compound or the platinum compound used alone.

EXAMPLE 7

Additional TCLP tests were carried out in the same way as were those described in Ex. 1. However, in this case, two series of tests were conducted with increasing amounts of finely divided metallic silver (with most particles in the 0.5–1.0 micron range). 50 mg of copper as the compound copper dihydroxide carbonate (CDC) was included in one series of tests, while the other series of tests were carried out without the addition of a soluble copper-containing compound. The results of these TCLP tests (extracted mercury concentrations obtained with and without the addition of CDC) are plotted in FIG. 1 vs. the amount of metallic silver that was included in each test. As indicated, the amount of metallic silver needed to reduce the leachable mercury concentration to below the 0.2 mg/l threshold level in the presence of only 50 mg of soluble copper is a small fraction of that required in the absence of the soluble copper compound.

EXAMPLE 8

Figure 2:
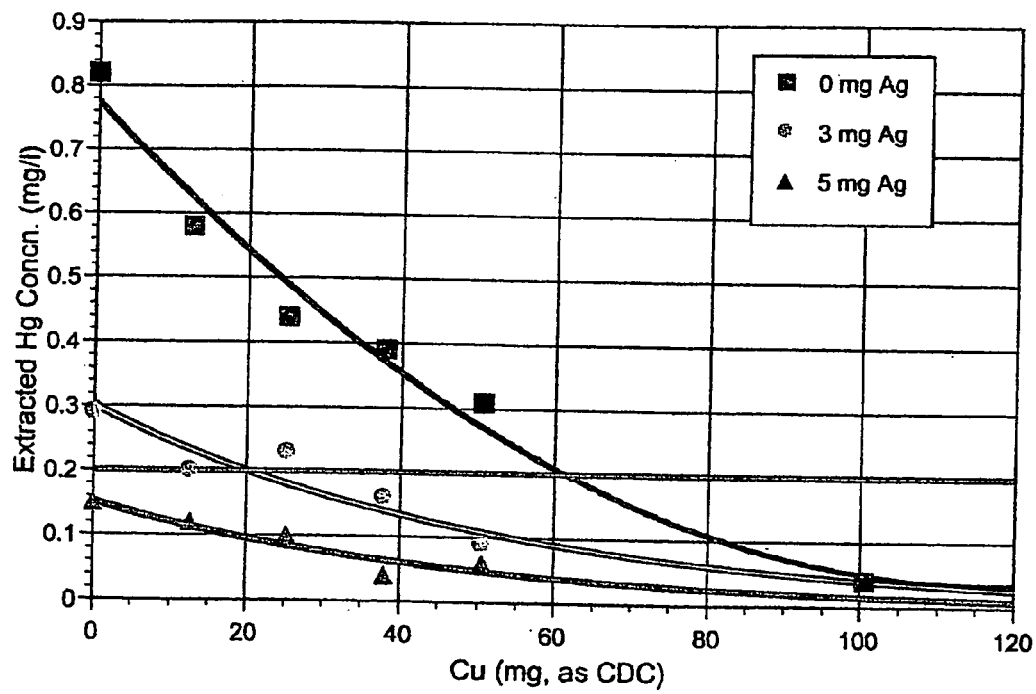
FIG. 2 is a graph providing test results with various amounts of ionic copper addition.

Three additional series of TCLP tests were carried out similar to those described in Ex. 7. However, in each of these test series, the amount of soluble copper (as CDC) was systematically varied while the amount of metallic silver powder was held constant at 0, 3, or 5 mg. The results of these TCLP tests (extracted mercury concentrations obtained with the addition of 0, 3, or 5 mg of 0.5–1.0 micron metallic silver powder) are plotted in FIG. 2 vs. the amount of soluble copper that was included in each test. As shown, the amount of soluble copper needed to reduce the leachable mercury concentration to below the 0.2 mg/l threshold level decreases rapidly with the addition of very small amounts of metallic silver.

EXAMPLE 9

Additional TCLP tests were carried out with commercial 32WT8 fluorescent lamps manufactured without metallic mercury but with 8.5 mg of ionic mercury (as HgO) soluble in the TCLP extraction fluid. Several tests were run with lamps having each of three different basing cement compositions. The basing cement was a typical cement comprising an inert filler of $CaCO_3$ and a polymer such as phenol formaldehyde. Type 1 cement was formulated in the normal way except that it contained about 34 mg of silver as $Ag_2CO_3$. Type 2 cement was formulated in the normal way except that it contained about 250 mg of copper (as CDC, substituted for about 25% of the $CaCO_3$ cement filler material). Type 3 cement was identical to type 2, except that it contained about 17 mg of silver (as $Ag_2CO_3$) in addition to about 250 mg of copper (as CDC). The averaged TCLP results obtained with lamps containing each of these three cement compositions are listed in Table 7 below.

Figures 3, 4:
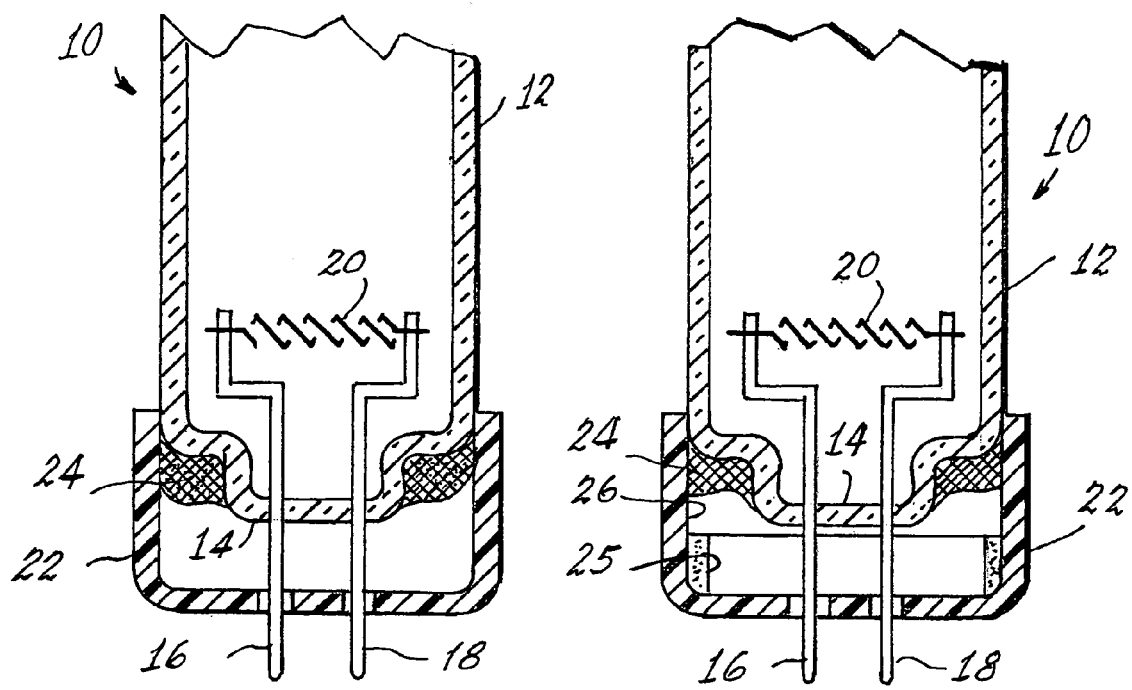
FIG. 3 is a diagrammatic view of a lamp employing an embodiment of the invention.
FIG. 4 is a view similar to FIG. 3 of an alternate embodiment.

FIG. 3 illustrates diagrammatically a portion of a fluorescent lamp 10 having an envelope 12 sealed at one end 14. Two electrical lead-ins 16, 18 are sealed into the end 14 and interior of the envelope mount a filamentary cathode 20. Exteriorly of the envelope the lead-ins project from a base 22 for connection to a power source. The base 22 is cup-shaped and sealed to the envelope 12 by a basing cement 24, which can be formulated as described above.

TCLP Results for T8 Lamps without Metallic Hg, with 8.5 mg $Hg^{2+}$ (as HgO), and with Type 1, 2, or 3 Basing Cement.

TABLE VII

| Cement Type | Ag (as $Ag_2CO_3$) (mg) | Cu (as CDC) (mg) | Leached Hg (mg/L) |
|---|---|---|---|
| 1 | 34 | 0 | 0.21 |
| 2 | 0 | 250 | 0.20 |
| 3 | 17 | 250 | 0.02 |

It is seen that leachable mercury concentrations at or above the regulatory threshold are obtained with lamps manufactured with cements containing about 34 mg of silver or about 250 mg of copper (as compounds soluble in the TCLP extraction fluid). However, almost no mercury is leached from a lamp manufactured with a cement containing only 17 mg of silver (as $Ag_2CO_3$) combined with only 250 mg of soluble copper (as CDC).

Alternatively, a quantity 25 of the non-metallic copper-containing compound and the noble metal or noble metal compound can be applied as a coating on the inside surface 26 of the base 22, as is shown in FIG. 4.

While there have been shown and described what are presently considered to be the preferred embodiments of the invention, it will be apparent to those skilled in the art that various changes and modifications can be made herein without departing from the scope of the invention as defined by the appended claims.

What is claimed is:

1. A method for inhibiting mercury from leaching from a land-filled arc discharge lamp containing a quantity of elemental mercury at least partially convertible to soluble mercury, said method comprising:
   including within said lamp a quantity of a non-metallic copper-containing compound and an ingredient X, said ingredient X including a noble metal or noble metal compound selected from the group consisting of silver and compounds of silver, gold and platinum.

2. The method of claim 1 wherein said soluble mercury is present as mercury oxide.

3. The method of claim 1 wherein said non-metallic copper-containing compound comprises copper dihydroxide carbonate.

4. The method of claim 1 wherein said ingredient X comprises elemental silver.

5. The method of claim 1 wherein said ingredient X comprises silver oxide as $Ag_2O$.

6. The method of claim 1 wherein said ingredient X comprises silver carbonate.

7. The method of claim 1 wherein said ingredient X comprises gold chloride as $AuCl_3$.

8. The method of claim 1 wherein said arc discharge lamp has a base held to said lamp by a basing cement and said non-metallic copper-containing compound and ingredient X are included in said basing cement.

9. A method for inhibiting mercury from leaching from a land-filled arc discharge lamp containing a quantity of elemental mercury at least partially convertible to soluble mercury, said method comprising:
   including within said lamp a quantity of a non-metallic copper-containing compound and platinum chloride as $PtCl_2$.

* * * * *